Oct. 26, 1926.

G. W. DAVISSON 1,604,148

CARBON PRODUCING APPARATUS

Filed Oct. 9, 1924

Inventor
G. W. Davisson

By Clarence A. O'Brien
Attorney

Patented Oct. 26, 1926.

1,604,148

UNITED STATES PATENT OFFICE.

GEORGE W. DAVISSON, OF IDAMAY, KENTUCKY.

CARBON-PRODUCING APPARATUS.

Application filed October 9, 1924. Serial No. 742,623.

This invention relates to improvements in apparatus for producing carbon black from natural gases, and has for its principal object to provide a means for eliminating waste and increasing the amount of the finished product obtained from the same amount of raw material ordinarily used.

In the apparatuses now generally in use for producing carbon black, a considerable amount of the carbon black is wasted, due to the fact that the outer sides of the endmost carbon black collecting channels are not scraped, thereby leaving the carbon black deposits thereon. Ordinarily, these channels are of great length, and the carbon deposits on the outer sides of the endmost channels amount to approximately slightly over one pound in weight at the end of the day, and it is readily seen the necessity for providing the means for preventing this ordinary waste.

One of the important objects of the present invention is to provide means, in combination with carbon black receiving hoppers, in which are mounted the scrapers for scraping the outer sides of the endmost carbon black collecting channels so that all of the carbon deposits on the channels will be scraped therefrom and depositioned into the hopper disposed below the same.

A further object of the invention is to provide a device of the above mentioned character, which is simple in construction, inexpensive, strong, and durable, and further well adapted for the purposes for which it is designated.

Other objects and advantages of this invention will become apparent during the course of the following description.

In the accompanying drawings, forming a part of this specification, and in which like numerals designate like parts throughout the same:

Figure 1:
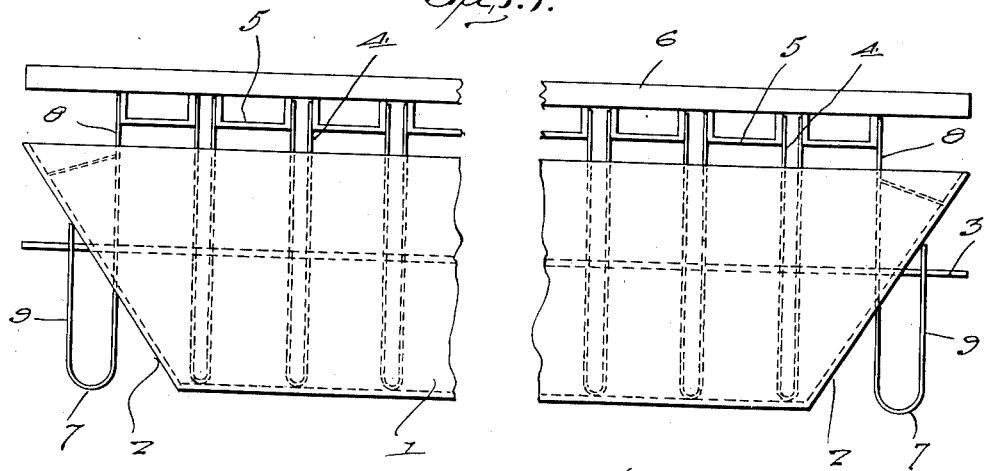
Figure 1 is a side elevation of the carbon black receiving hopper, showing my attachment associated therewith, and the manner in which the same cooperates with the outer sides of the endmost channels.
Figure 2:
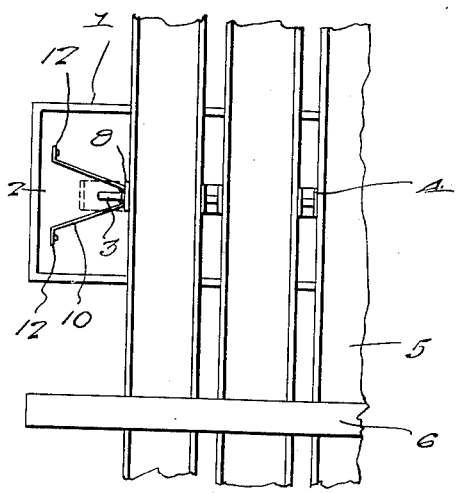
Figure 2 is a fragmentary top plan view, showing the securing means for the scraper embodying my invention.
Figure 3:
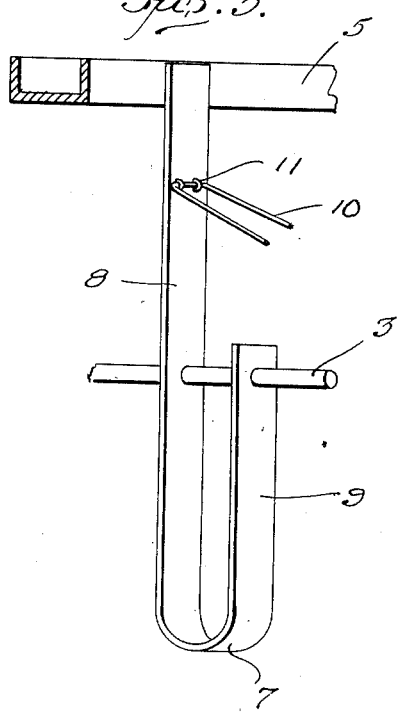
Figure 3 is a detail perspective view of my improved scraper attachment.

In the drawing, wherein for the purpose of illustration is shown the preferred embodiment of my invention, the numeral 1 designates the usual carbon black receiving hopper, the end walls of which are inclined, as illustrated at 2. Extending longitudinally through the substantially rectangular hopper 1 is the rod 3, the ends of which extend outwardly of the end walls 2. The rod 3 is further adapted to extend through the substantially U-shaped scraping members 4, the bottoms of which rest in the bottom of the hopper, while the upper ends of the arms thereof engage the adjacent sides of the carbon black collecting channels, shown at 5.

The channels 5 are supported in the well known manner upon a travelling carriage, whereby the channels are adapted for reciprocatory movement across the stationary hopper 1, in the manner well known in the art. A spacing bar 6 extends across the upper edges of the parallel spaced channels 5, adjacent the receptive ends thereof, in a manner also well known in the art.

The natural gas is directed through suitable piping (not shown) to burners which are arranged directly below the bottoms of the several channels in the manner well known in the art, and when the burners are ignited, the flame will strike the bottom of each channel and spread in lateral directions. The flame will envelop the bottom and sides of each channel, and will curl over the upper edges of the sides of the channels thus causing carbon black to collect or form on the outside of the respective channels. When the channels, with the carbon black deposits on the outer sides thereof are reciprocated across the hopper 1, which is stationary, the upper ends of the arms of the scraping members 4 will engage the adjacent sides of the channel and scrape the carbon deposits therefrom, causing the carbon black to be deposited into the hopper 1. However, the outer sides of the endmost channels are left unscraped, and the carbon deposits thereon are not removed with the scraping means now generally employed for removing the carbon deposits from the collecting channels. To overcome this disadvantage, and further prevent unnecessary waste, as well as increasing the amount of the finished product from the same amount of raw material ordinarily used, I provide a means which is adapted to be associated with the hopper, whereby the carbon deposits on the outer sides of the endmost collecting channels will be scraped simultaneously with the scraping or carbon removing operation herein described.

The attachment for scraping the outer sides of the endmost channels comprises a substantially U-shaped scraping member 7, arranged at each end of the hopper, as is clearly illustrated in the drawing. Each of the U-shaped scraping members 7 includes a relatively long arm 8, and a short arm 9. The relatively long arm of each of the scraping members 7 is adapted to extend upwardly through a suitable slot provided therefor in each of the end walls 2 of the hopper, so that the upper ends of each of the longer arms will engage the outer sides of the endmost channels.

The upper end of the shorter arm 9 of each of the U-shaped scraping members 7 will abut the outer face of the respective end wall, and each of the U-shaped scraping members 7 is provided with a pair of registering openings, through which the rod 3 is adapted to extend whereby the scraping members 7 are supported in proper position with respect to the hopper and the channels. The upper portion of the longer arm 8 of each of the U-shaped scraping members 7 is held in proper position within the hopper, so that the upper end thereof will be in engagement with the outer side of each of the endmost channels, by means of the anchoring members 10. The latter includes a substantially V-shaped piece of wire, the apex of which is secured to each of the longer arms 8 of the substantially U-shaped scraping members 7, as is illustrated at 11, the free ends of the arms of the V-shaped members 10, being disposed laterally and secured to the respective end walls of the hopper, in the manner as illustrated at 12.

It will thus be seen from the foregoing description that the carbon black which is deposited on the outer side of the endmost channel will be scraped therefrom and deposited into the hopper with the carbon black collected from the sides of the channels by the other scraping member mounted in the hopper. The simplicity with which my attachment is constructed enables the same to be readily and easily attached in position on the stationary hoppers now generally in use, and adapted for the particular purposes above set forth, without necessitating any material alteration of the hopper.

While I have shown the preferred embodiment of my invention, it is to be understood that various changes in the size, shape, and arrangement of parts may be resorted to, without departing from the spirit of the invention, and the scope of the appended claims.

Having thus described my invention, what I claim is:

1. In a carbon producing apparatus, comprising in combination with the carbon black receiving hopper, wherein the end walls of the latter are inclined, the usual U-shaped scrapers in the hopper, and the longitudinally extending supporting rod, the ends of which extend through the inclined ends of the hopper and support the U-shaped scraper in the hopper, of means for removing the carbon black deposits from the outer sides of the endmost usual carbon black collecting channels comprising a pair of substantially U-shaped scrapers supported on the ends of the rods adjacent the inclined ends of the hopper, each of said additional scrapers including a relatively long arm, and a relatively short arm, the relatively long arm extending through a slot provided therefor in the end wall of the hopper, the upper ends of each of the relatively long arms engaging the outer sides of the respective endmost channels, and anchoring means associated with the longer arms of each of the additional U-shaped scrapers and the respective end walls of the hopper.

2. In a carbon producing apparatus comprising in combination with the carbon black receiving hopper wherein the end walls of the latter are inclined, the usual U-shaped scrapers in the hopper and the longitudinally extending supporting rod, the ends of which extend through the inclined ends of the hopper and support the U-shaped scraper in the hopper, of means for removing the carbon black deposits from the outer sides of the endmost usual carbon black collecting channels comprising a pair of substantially U-shaped scrapers supported on the ends of the rods adjacent the inclined ends of the hopper, each of said additional scrapers including a relatively long arm, a relatively short arm, the relatively long arm extending through a slot provided therefor in the end wall of the hopper, the upper ends of each of the relatively long arms engaging the outer sides of the respective endmost channels, anchoring means associated with the longer arms of each of the additional U-shaped scrapers and the respective end walls of the hopper, said anchoring means comprising a substantially V-shaped member, the apex of which is secured to the longer arm of each of the additional scrapers, the free ends of the arms of the V-shaped members being disposed laterally and secured to the inner face of the respective end walls of the hopper.

In testimony whereof I affix my signature.

GEORGE W. DAVISSON.